Aug. 20, 1968   D. P. SHELDON   3,398,331
RELAY CIRCUIT FOR VACUUM SYSTEM CONTROL WITH PENTODE TUBE MEANS
Filed Nov. 30, 1965

United States Patent Office 3,398,331
Patented Aug. 20, 1968

3,398,331
RELAY CIRCUIT FOR VACUUM SYSTEM CONTROL WITH PENTODE TUBE MEANS
Deane P. Sheldon, Franklin, Mass., assignor to National Research Corporation, Cambridge, Mass., a corporation of Massachusetts
Filed Nov. 30, 1965, Ser. No. 510,494
3 Claims. (Cl. 317—149)

ABSTRACT OF THE DISCLOSURE

Relay actuated as a function of pressure as measured by a cold cathode discharge gauge. The gauge has an amplifier circuit which is designed to compensate for hysteresis in the relay element, but allows for adjustment of the relay's set point.

---

The present invention relates to vacuum instruments and particularly to overpressure protection devices.

It is the object of the invention to provide an overpressure control protector for operating a relay switch having the capability of being adjusted to several set points and of accomplishing this result in a simple and economic fashion.

I achieve the foregoing object by the provision of a cold cathode discharge gauge operating a relay through the control grid of an amplifier tube. The amplifier tube is selected so that it has a screen grid which can be substituted for controlling the plate of the tube when desired to counterbalance the hysteresis of the relay element. Now it is old in the art to compensate for hysteresis effects in relays by circuitry which artificially varies the bias of the control grid. But such circuitry would be impractical in combination with a Phillips gauge, particularly where it is desired to provide adjustability of the overpressure set point. My invention makes it possible to combine a discharge gauge with a relay with the new result that hysteresis caused instability is eliminated without the use of expensive additional circuitry.

Figure 1:
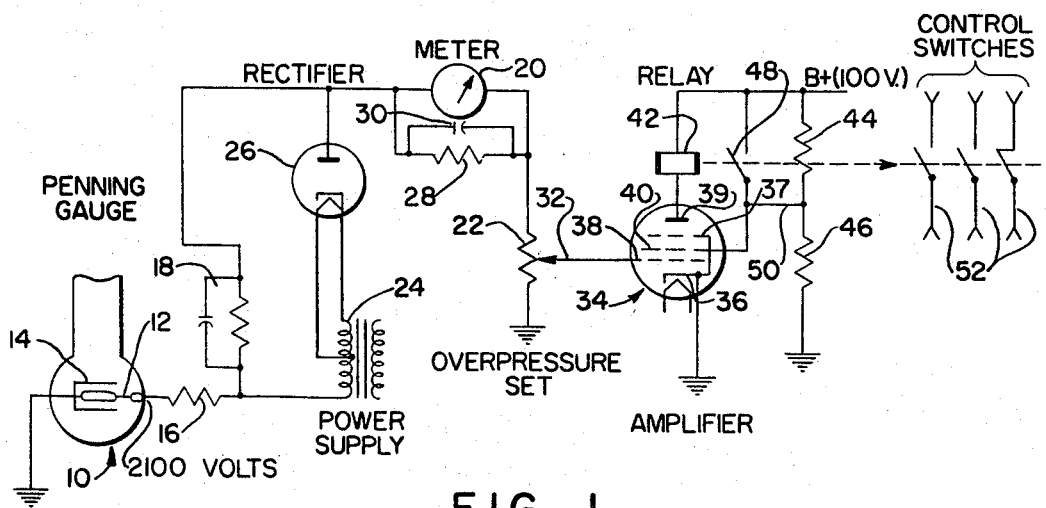
Figure 2:
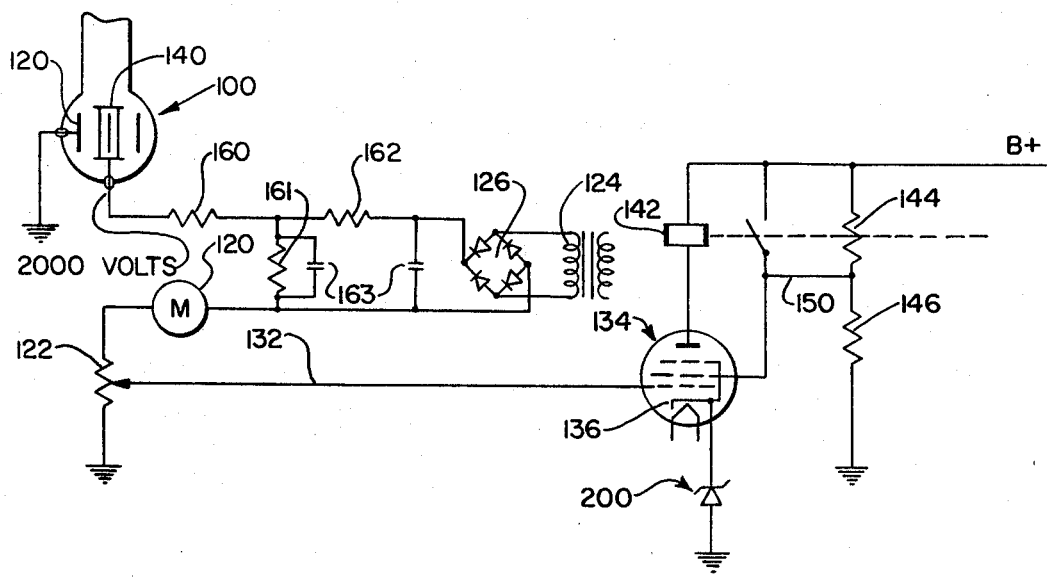

The practice of the invention will be understood most readily by reference to the following description of two embodiments taken in conjunction with the accompanying drawings wherein FIGS. 1 and 2 are circuit diagrams of the two embodiments.

A cold cathode discharge gauge 10 is shown in FIG. 1 of the drawing. The gauge comprises an anode 12 and a cathode 14 and a magnet (not shown). A discharge between the anode and cathode ionizes gas in the gauge producing a resultant ion current to the cathode which varies linearly with pressure. A circuit loop including the gauge is formed as follows: ground—cathode 14—anode 12—resistor 16—rectifier tube 26—filter 18—meter 20—potentiometer 22—ground. Bias voltage for the gauge is provided by a transformer 24 whose secondary winding is connected to the loop via a rectifier 26. The conventional shunt resistor 28 and capacitor 30 are provided for meter 20.

A tap 32 is provided from the potentiometer 22 of the circuit loop to carry the signal to a relay 42 via an amplifier tube 34. The tube comprises a cathode 36, control grid 38, screen grid 40, suppressor grid 37 and plate 39. The cathode is grounded. The control grid is connected to said tap 32. The amplifier circuit has a voltage divider consisting of resistors 44 and 46 between the B voltage supply and ground with a tap 50 to the screen grid 40. A switch 48 is provided for connecting the screen grid directly to the B voltage supply.

The relay 42 operatecs a plurality of switches 52 which can be arranged to open or close in the energized condition of the relay. The relay also operates the switch 48 to close when the relay is de-energized and to open when the relay is energized. Thus, the screen grid will be at B voltage when the relay is de-energized and at a lesser voltage when the relay is energized. In the former condition, the tube displays characteristic triode operation, in the latter condition—pentode operation.

In a typical arrangement, the above component elements are selected as follows:

| | |
|---|---|
| Penning gauge 10 | A built-in gauge incorporated in a mass spectrometer as described in copending S.N. 332,154, filed Dec. 20, 1963. |
| Resistor 16 | Four .27M, 2 watt resistors in series. |
| Filter 18 | resistor, four 2.2M, 2 watt resistors in series; capacitor, 0.1 microfarad. |
| Rectifier 26 | 2X2A tube. |
| Meter 20 | 1 milliamp full scale. |
| Resistor 28 | 4.7K, ½ watt. |
| Capacitor 30 | .001 microfarad. |
| Resistor 22 | 150K, ½ watt. |
| Amplifier 34 | 6EW6 sharp cutoff pentode. |
| Relay 42 | Ohmite #GPRTPX-90T 3 pole, double throw, 10K coil. |
| Resistors: | |
| 44 | 22K, ½ watt. |
| 46 | 150 K, ½ watt. |

The operating voltages are indicated on the drawing.

The tap 32 is preferably adjusted to provide an overpressure set point of 0.2 micron pressure indication on meter 20 to cut off tube 34. That is, when pressure in the gauge tube 10 raises sufficiently to cause a 0.2 micron reading on meter 20, then tube 34 will stop conducting and relay 42 will be de-energized. Switch 48 will close to connect screen 40 to the B voltage supply. The result will be that when the pressure falls sufficiently so that meter 20 reads 0.2 micron, the tube 34 will conduct sufficiently to re-energize relay 42, thus operating switch 48 to restore pentode operation.

The operator may adjust tap 32 to provide different set points and the operation will be similar to that described above for a set point of 0.2 micron.

A second embodiment of the invention is shown in FIG. 2. The essential circuit elements are as follows:

| | |
|---|---|
| Penning gauge 100 | NRC model 524 gauge with cathode 140 and grounded anode 120. |
| Resistors: | |
| 160 | 6.8 meg, 1 watt. |
| 161 | 4.7 meg., 2 watt. |
| 162 | 100K, ½ watt. |
| Capacitors 163 | .05 microfarad, 2500 v. D.C. |
| Meter 120 | 50 microamperes full scale. |
| Resistor 122 | 10K, 1 watt. |
| Amplifier 134 | Same as FIG. 1 (34). |
| Relay 142 | Same as FIG. 1 (42). |
| Resistors: | |
| 144 | Same as FIG. 1 (44). |
| 146 | Same as FIG. 1 (46). |

In addition, the circuit of FIG. 2 has a Zener diode 200 (type IN 3821) connecting the cathode to ground. This embodiment is similar to the preferred embodiment of FIG. 1 in that the cathode of the amplifier tube is held at a fixed voltage level. The difference is that the fixed level is about 5 volts in this case and ground in the FIG. 1 circuit.

Another major difference is that the cathode of the

Penning gauge is held at high tension in FIG. 2 and at ground in FIG. 1.

The common advantage of the various possible embodiments of my invention is that reliable pressure responsive relay is provided at low cost—about one-tenth the cost of the conventional meter relay now used in the industry to perform the same function. Where the vacuum industry has attempted the use of a relay directly operated by a cold cathode gauge, the operation has been unreliable because of relay hysteresis.

What is claimed is:

1. A pressure responsive relay comprising, in combination, a cold cathode discharge gauge, a power supply therefor, an amplifier vacuum tube having a cathode, control grid, screen grid, plate, a source of B voltage for the tube, means for holding the cathode at a fixed potential, a relay electrically connected to the plate, a circuit loop including said gauge, power supply and ground, means tapping into said circuit at a point at a potential no greater than cathode potential and connected to said control grid to transmit a pressure dependent current from said gauge, means for automatically adjusting the voltage level of the screen grid between B voltage and a lesser voltage, said adjusting means being constructed and arranged to respond to energizing and de-energizing of the relay.

2. The apparatus of claim 1 wherein the amplifier cathode is held at ground potential.

3. The apparatus of claim 2 wherein the gauge cathode is connected to ground.

References Cited

UNITED STATES PATENTS

| | | | |
|---|---|---|---|
| 2,604,514 | 7/1952 | Neil | 324—33 |
| 2,624,847 | 1/1953 | Jesse et al. | 250—83.6 |
| 2,801,387 | 7/1957 | Mitchell et al. | 324—33 |
| 3,007,080 | 10/1961 | Benson | 315—159 |
| 3,065,411 | 11/1962 | Roberts | 324—33 |

LEE T. HIX, *Primary Examiner.*

J. A. SILVERMAN, *Assistant Examiner.*